United States Patent Office 3,772,226
Patented Nov. 13, 1973

3,772,226
SUSPENSION POLYMERIZATION OF VINYL CHLORIDE
Eric Powell and Ross M. Kitchen, Shawinigan South, Quebec, Canada, assignors to Gulf Oil Canada Limited, Toronto, Ontario, Canada
No Drawing. Filed June 4, 1971, Ser. No. 150,167
Int. Cl. C08f 1/11, 1/13
U.S. Cl. 260—17 A                     11 Claims

ABSTRACT OF THE DISCLOSURE

An improvement in aqueous suspension polymerization of vinyl chloride is disclosed wherein particular copolymers of maleic anhydride and alpha-olefins of 6–20 carbon atoms are used, in combination with known protective colloids, as suspending agents.

---

This invention relates to aqueous suspension polymerization of vinyl halides, together with minor amounts of comonomers if desired, and more particularly it relates to the preparation of granular polyvinyl chloride having improved dry blending characteristics by the use of particular suspending agents in the suspension polymerization.

The technique of aqueous suspension polymerization of vinyl chloride is well-known and basically involves mixing the monomer as a liquid with water and a free radical producing polymerization initiator which is preferably oil soluble, and then, at the desired polymerization temperature, maintaining the monomer dispersion by means of agitation until polymerizaton has occurred to the desired degree of monomer conversion. The polymer granules are subsequently recovered by conventional procedures of centrifugation, washing, and drying. Materials known as "suspending agents" are used in the polymerization to keep the polymer granules from agglomerating and causing large variations in particle size, as well as to prevent deposit of polymer on equipment surfaces.

Granular polyvinyl chloride resins which are to be used for compouning for many purposes desirably have a high degree of porosity, i.e. the resin will rapidly absorb large amounts of plasticizer to form what are known as "dry blends". Additionally, the heat stability of the resin must be satisfactory, and, as the resin is often required for electrical uses, the electrical resistivity should be as high as possible.

The properties of granular polyvinyl chloride resin products are affected by many variables relating to the suspension polymerization technique. For instance the porosity of resin granules tends to decrease sharply if the polymerization is carried to greater than about 90% monomer conversion. Thus, in much conventional suspension polymerization of vinyl chloride, the reaction is discontinued at about 85% monomer conversion. The particular suspending agent used in the polymerization has a great effect on resin properties. A wide variety of substances, generally water soluble, have been suggested in the art for use as suspending agents. Examples are cellulose derivatives, gelatin derivatives, partially hydrolyzed polyvinyl acetates, copolymers of maleic anhydride with styrene, vinyl acetate, or ethylene, vinyl acetate/allyl alcohol copolymers, polyvinyl pyrrolidone, phenol-aldehyde condensation resins, and many others. Numerous materials suggested for use as suspending agents impart high porosity characteristics to the product polymer but at the same time tend to increase the particle size to an unsuitable level. Combinations have therefore been suggested in the art to achieve improved porosity with suitable particle size control; thus, the use of "primary" and "auxiliary" suspending agents.

It has now been found that certain maleic anhydride/alpha-olefin copolymers, which per se are water insoluble, are particularly useful in achieving porosity of resin granules, when used in conjunction with a known type of particle size control agent in aqueous suspension polymerizations involving vinyl chloride monomer. As indicated, a variety of water-soluble copolymers of maleic anhydride with e.g. styrene, vinyl acetate, or ethylene, have been used in the art and copolymers of maleic anhydride with isobutylene have also been suggested. However, the art has given no suggestion that the water-insoluble copolymers of maleic anhydride and higher alpha-olefins would be of any use in this application either alone or in combination with conventional materials.

The invention thus consists of an improvement in a process for the aqueous suspension polymerization of vinyl halide monomer, optionally in the presence of minor amounts of an ethylenically unsaturated monomer copolymerizable therewith, the polymerization being effected using a monomer-soluble free radical producing polymerization initiator, which improvement comprises using as suspending agents a combination of (1) a low molecular weight water insoluble copolymer of maleic anhydride and an alpha-olefin containing 6 to 20 carbon atoms and (2) a nonionic water soluble hydrophilic colloid.

The maleic anhydride copolymers with which the improvement according to the present invention is concerned are contemplated as being per se water-insoluble, low molecular weight copolymers of maleic anhydride, or equivalent material e.g. maleic acid, and alpha-olefins having from 6 to 20 carbon atoms. The preferred olefins contain 14–18 carbon atoms, the most preferred being n-octadecene-1. For the purposes of the present invention the anhydride form of the copolymer, which is insoluble in water, should be used and is initially dispersed in the aqueous medium. Although under the pH conditions of the suspension polymerization the copolymer may be partially solubilized, the initial use of a water-soluble form of the copolymer, e.g. sodium salt, together with the nonionic water-soluble hydrophilic colloid, generally does not give a dry blend resin, i.e. the resin is of very low absorptivity. If a nonionic surfactant is used in conjunction with the sodium salt of the copolymer and the colloid, improved results in terms of porosity are achieved but on the whole the other resin properties are generally not satisfactory. The copolymers advantageously contain a 1:1 molar ratio of maleic anhydride and alpha-olefin, although this can be varied to some extent. The degree of polymerization of the copolymers which is suitable for the purposes of the present invention depends on the length of the olefin carbon chain. Preferably if the olefin contains 6 to about 10 carbon atoms i.e. hexene-1 to decene-1, a suitable degree of polymerization is of the order of 20 to 30. For higher alpha-olefin comonomers e.g. tetradecene-1, octadecene-1, a degree of polymerization of the order of 5, for example 4–10, is highly satisfactory. The average degree of polymerization can be varied of course, but should be such as not to exceed about 100.

The maleic anhydride/alpha-olefin copolymers described herein must be used in conjunction with other suspending agents in order to obtain control of polymer particle size. Suitable suspending agents for this purpose are the nonionic water-soluble hydrophilic colloids known in the art of aqueous suspension polymerization. Examples are water-soluble cellulose ethers, preferably methyl cellulose, and water-soluble polyvinyl alcohols. It is known in the art that for use as a suspending agent water-soluble methyl cellulose, for example, should be of low degree of polymerization. The degree of polymerization of the methyl cellulose is indicated by viscosity of a 2% aqueous solution at 20° C. and, for use with the maleic anhydride/ alpha-olefin copolymers according to the present invention, is preferably of the order of 10–20 centipoises. The water-soluble polyvinyl alcohols are incompletely hydrolyzed polyvinyl esters having a degree of hydrolysis of 60–99%. For use according to the present invention the degree of hydrolysis of the polyvinyl alcohol is preferably about 70–80%. A low degree of polymerization, as indicated by the viscosity of a 4% aqueous solution of the polyvinyl alcohol at 20° C., is also preferred as known in the art e.g. preferably a viscosity in the range from 2 to 15, most preferably 5 centipoises. The combination of suspending agents according to the present invention, when used for the homopolymerization of vinyl chloride is particularly effective in achieving highly satisfactory dry blend characteristics of the resin while at the same time maintaining and controlling resin particle size.

The overall quantities of the combination of suspending agents suitable for use according to the present invention are within the conventional range of proportions for suspending agents, i.e. about 0.05 to about 2% by weight of monomer, preferably 0.1 to 0.5% by weight of monomer. The ratio of maleic copolymer to water-soluble colloid may be varied considerably e.g. 3:1 down to 0.2:1, preferably 1 to 0.2:1. However, the total amount of suspending agents to be used in any particular instance and the relative amounts of the components depends on a number of factors, e.g. geometry and size of equipment, impurities in the monomer, which would be recognized by one skilled in the art of suspension polymerization. It is difficult and unnecessary here to define quantitative relationships which are valid for all conditions.

Other than the particular combination of suspending agents used according to the improvement of the present invention, the suspension polymerization technique is conventional. The ratio of water to monomer used is preferably about 1.5:1 to 2:1 although this can be varied. The free radical polymerization initiators used in suspension polymerization of vinyl chloride are generally soluble in the monomer phase, rather than in the aqueous phase. Examples of suitable initiators used singly or in combination are benzoyl peroxide, lauroyl peroxide, ditertiary butyl peroxide, azodiisobutyronitrile, acetyl cyclohexanesulfonyl peroxide, tert-butyl peroxypivalate, and many others. These are generally used in overall amounts of about 0.01% to 0.5% by weight of monomer. The temperature of polymerization will of course depend on the desired molecular weight of the polymer but in general terms will be in the range of about 45° C. to about 70° C., preferably about 50° C. to 60° C. With the improvement according to the present invention, as with conventional processes, homopolymerization of vinyl chloride is discontinued when a monomer conversion of about 85% has been attained in order to prevent a decrease in particle porosity which occurs with conversion approaching 100%.

The use of the improvement according to the present invention is contemplated as including, in addition to suspension polymerization of vinyl chloride or other vinyl halides alone, the suspension copolymerization of vinyl halides with minor amounts of ethylenically unsaturated monomers copolymerizable therewith, for example vinyl esters such as vinyl acetate, vinyl propionate, vinyl butyrate, acrylic and methacrylic esters, and alpha-olefins e.g. ethylene. However, the main benefit to the use of the suspending agents according to the present invention is in obtaining polyvinyl chloride resins having excellent dry blend characteristics.

The examples to follow are to be taken as illustrative of the invention but not limiting to the scope thereof. In the examples, porosity of the resins is indicated by "drying time," a measure of the rapidity of formation of a dry blend from resin and plasticizer. "Drying time" is determined by means of a Brabender Plasticorder fitted with drying head. The sample is prepared by mixing 185.3 grams of resin with 22 grams of clay-stabilizer mix. The clay-stabilizer mix consists of 12.7 grams clay SP33 (trademark), a water-washed, fractionated aluminosilicate clay having low electrolyte content, sold by Freeport Kaolin Co. and 9.3 grams Stabilizer 410 (trademark) which is tribasic lead stearate. The sample is charged into the instrument head, the cover put in place and blade rotation started and maintained at 65 r.p.m. The instrument is preconditioned with an oil bath to a jacket temperature of 88° C. After 5 minutes, 98 mls. of dioctyl phthalate at 25° C. is added to the head using a spreader funnel. After 30 seconds, when plasticizer addition is complete, the cover is again put in place. The plasticorder instrument gives a continuous reading of torque generated; after plasticizer has been added the torque increases to a maximum, eventually falls off relatively sharply to a minimum, then increases slightly to a plateau. The difference in seconds between the time at which the minimum torque is reached after plasticizer addition minus the time at which plasticizer is added is designated as the "drying time."

EXAMPLE 1

Part C of this example illustrates results obtained by the use of a combination of suspending agents according to the present invention compared to those obtained with "conventional" suspending agents as in Parts A and B.

Part A.—Aqueous suspension polymerization was carried out in a 20 gallon stainless steel jacketed polymerization autoclave fitted with a propeller stirrer and a baffle. The initial charge added to the autoclave consisted of 48 kgms. de-ionized water. Stirring was started and maintained at 150 r.p.m. as 6 grams sodium bicarbonate, 60 grams (0.28% by weight of monomer) of "Rhodoviol" (trademark), a polyvinyl alcohol of saponification number 270 and viscosity in 4% aqueous solution of 5 cps. sold by Rhône-Poulenc, 12 grams of sorbitan monolaurate nonionic emulsifier, and 10 grams of a mixture of two monomer-soluble free radical producing polymerization initiators having different rates of free radical production, were added to the water. Stirring was discontinued as air was evacuated from the sealed autoclave; 26 kgm. liquid vinyl chloride monomer was then charged thereto. Stirring was restarted and was maintained at 150 r.p.m. during heating to 56–57° C. and throughout the polymerization reaction. When the pressure in the autoclave started to drop, polymerization was allowed to continue until a pressure drop of 20 p.s.i.g. had occurred, the total polymerization time being 6.2 hours. The reaction was then terminated by venting residual monomer and cooling of the autoclave contents. The product polymer granules were separated by centrifugation, washing, and drying. The resin was found to have a "drying time" of 234 seconds and a particle size distribution such that 77% passed through an 80 mesh screen and 15% through a 140 mesh screen.

Part B.—The procedure of Part A was repeated except that the polyvinyl alcohol and nonionic surfactant were replaced by 60 grams of Methocel MC-15 (trademark), a methyl cellulose having a viscosity in 2% aqueous solution at 20° C. within the range 13–18 centipoises and containing within the range 27.5 to 31.5% by weight methoxyl groups, sold by Dow Chemical Company, as the sole suspending agent. The product resin was not a dry blend resin; it had a drying time of greater than 400 secs. and a "Within Pore Volume" (WPV) of only about 7 ccs./100 gms. resin.

Part C.—The procedure of Part A was repeated except that the polyvinyl alcohol and nonionic surfactant were replaced with 60 grams of PA-18 (trademark) copolymer, a 1:1 mole ratio n-octadecene-1/maleic anhydride copolymer having a melting range of 115–119° C., specific gravity of 0.973, inherent viscosity 0.144 (5.0 g./dl., methyl isobutyl ketone at 77° F.), and water solubility of less than 1% by weight, sold by Gulf Oil Company, Chemicals Department, and 60 grams of another methyl cellulose than that used in Part B and having a viscosity in 2% aqueous solution at 20° C. of 18 cps. Thus the total amount of suspending agents was 0.46% by weight of monomer and the weight ratio of PA-18 copolymer:methyl cellulose was 1. The reaction time was 7.2 hours. The resin had a drying time of 144 secs. and a particle size distribution such that 99% passed through an 80 mesh screen and 31% through 140 mesh screen.

EXAMPLES 2-7

In all these examples the general procedure was as described in Example 1 Part A but using the octadecene-1/maleic anhydride copolymer and methyl cellulose suspending agents of Example 1 Part C in varying proportions. In most cases a 100 gallon autoclave was used rather than the 20 gallon autoclave with increase in the quantities of ingredients to 182 kgm. water, 100 kgm. vinyl chloride, 40 grams polymerization initiator, and 15-25 gm. sodium bicarbonate. Polymerization conditions are summarized in Table 1 and resin product properties in Tabel 2.

TABLE 1

| Ex. No. | H₂O (kg.) | VCl (kg.) | Total amount suspending agents/wt. monomer (percent) | Ratio PA-18 copolymer: methyl cellulose | Reaction time (hrs.) |
|---|---|---|---|---|---|
| 2 | 48 | 26 | 0.25 | 3.3 | 9.5 |
| 3 | 182 | 100 | 0.3 | 1.5 | 7.5 |
| 4 | 182 | 100 | 0.14 | 0.27 | 7.7 |
| 5 | 182 | 100 | 0.17 | 0.5 | 8.2 |
| 6 | 182 | 100 | 0.24 | 1.0 | 7.0 |
| 7 | 182 | 100 | 0.23 | 1.25 | 7.5 |

TABLE 2

| Example No. | Drying time (sec.) | Screen test percent through mesh 80 | Screen test percent through mesh 140 | Within pore volume (ccs./100 g.) |
|---|---|---|---|---|
| 2 | 179 | 61.8 | 25.9 | |
| 3 | 131 | 92.0 | 31.1 | |
| 4 | 190 | 72 | 23.9 | |
| 5 | 154 | 70 | 19.0 | 31.5 |
| 6 | 165 | 97.5 | 42.8 | |
| 7 | 146 | 82.1 | 17.2 | 33.7 |

In all cases the direct current resistivity and heat stability of the resins were satisfactory.

EXAMPLE 8

The procedure of Examples 3 to 7 was repeated using as suspending agents 30 grams of PA-18 copolymer and replacing the methyl cellulose of Examples 3-7 with 110 grams of Methocel MC-15 methyl cellulose. The reaction time was 7.5 hours. The product resin had a drying time of 175 secs. and a particle size distribution such that 65% passed through 80 mesh screen and 21% through 140 mesh screen.

EXAMPLE 9

The procedure of Examples 3-7 was repeated using as suspending agents 50 grams of PA-18 copolymer and 160 grams of a polyvinyl alcohol having a degree of hydrolysis of about 73% (saponification number of 280) and a viscosity in 4% aqueous solution at 20° C. of 5 cps. The total amount of suspending agents used was 0.21% by weight of monomer and the ratio of PA-18 copolymer to polyvinyl alcohol was 0.31:1. The reaction time was 7.5 hours. The product resin had a drying time of 139 seconds and a particle size distribution such that 99% passed through a 40 mesh screen and 59% through 140 mesh screen.

EXAMPLE 10

The procedure was as described in Example 1 Part A, but using 100 gallon autoclave, 182 kgms. water, 100 kgm. vinyl chloride monomer, 40 gms. initiator, and 20 gms. sodium bicarbonate. The suspending agent combination consisted of 55 grams of PA-14 (trademark) copolymer, a 1:1 mole ratio n-tetradecene-1/maleic anhydride copolymer having a melting range of 124-133° C., specific gravity 1.036, inherent viscosity 0.147 (5.0 g./dl. methyl isobutyl ketone at 77° F.), and water solubility of less than 1% by weight, sold by Gulf Oil Company Chemicals Department, and 110 grams of the methyl cellulose used in Example 1 Part C. Thus the total amount of suspending agents used was 0.17% by weight of monomer and the ratio of PA-14 copolymer to methyl cellulose was 0.5:1. The reaction time was 7.1 hours. The product resin had a drying time of 175 secs. and a particle size distribution such that 94.2% passed through an 80 mesh screen and 31.8% through 140 mesh screen.

EXAMPLE 11

The procedure was as described in Example 10 with the exception that 30 g. PA-10 (trademark) copolymer, a 1:1 mole ratio n-decene-1/maleic anhydride copolymer having a melting range of 131-135° C., specific gravity 1.224, inherent viscosity 0.151 (5.0 g./dl. methyl isobutyl ketone at 77° F.), and solubility in water of less than 1%, sold by Gulf Oil Company, Chemicals Department, was used instead of 55 grams PA-14 copolymer. Thus the total amount of suspending agents used was 0.14% by weight of monomer and the ratio of PA-10 copolymer to methyl cellulose was 0.27. The reaction time was 7.7 hours. The resin product had a drying time of 216 seconds and a particle size distribution such that 99.5% passed through 80 mesh screen and 70.2% through 140 mesh screen.

EXAMPLE 12

The procedure was as described in Example 10 with the exception that the PA-14 copolymer was replaced with 30 gms. PA-6 (trademark) copolymer, a 1:1 mole ratio n-hexene-1/maleic anhydride copolymer having a melting range of 156-164° C., specific gravity 1.246, inherent viscosity 0.145 (5.0 g./dl. methyl isobutyl ketone at 77° F.), and solubility in water of less than 1%, sold by Gulf Oil Company, Chemicals Department. The total amount of suspending agents used was 0.14 by weight of monomer and the ratio of PA-6 copolymer to methyl cellulose was 0.27. The reaction time was 7.6 hours. The resin product had a drying time of 225 seconds and a particle size distribution such that 89% passed through an 80 mesh screen and 46.1% through 140 mesh screen.

Numerous other modifications of the various expedients described can be made without departing from the scope of the invention which is defined in the following claims.

What is claimed is:

1. In a process for the aqueous suspension polymerization of vinyl halide monomer, optionally in the presence of minor amounts of an ethylenically unsaturated monomer polymerizable therewith, the polymerization being affected using a monomer-soluble free radical producing polymerization initiator, the improvement comprising using as suspending agents a combination of (1) a low molecular weight water-insoluble 1:1 molar copolymer of maleic anhydride and an alpha-olefin containing 6 to 20 carbon atoms, and (2) a nonionic water-soluble hydrophilic colloid effective as a suspending agent in vinyl halide aqueous suspension polymerization, the total amount of suspending agents used is in the range of about 0.05 to 2% by weight of monomer.

2. The improvement in a process as claimed in claim 1 wherein the vinyl halide monomer is vinyl chloride.

3. The improvement in a process as claimed in claim 2 wherein the maleic anhydride/alpha-olefin copolymer has a degree of polymerization of less than 100.

4. The improvement in a process as claimed in claim 2 wherein the alpha-olefin contains 14 to 18 carbon atoms.

5. The improvement in a process as claimed in claim 4 wherein the copolymer has a degree of polymerization of about 4 to 10.

6. The improvement in a process as claimed in claim 5 wherein the alpha-olefin is n-octadecene-1.

7. The improvement in a process as claimed in claim 2 wherein the nonionic water soluble hydrophilic colloid is methyl cellulose.

8. The improvement in a process as claimed in claim 7 wherein the methyl cellulose has a viscosity in 2% aqueous solution at 20° C. of 10–20 centipoises.

9. The improvement in a process as claimed in claim 2 wherein the nonionic water soluble hydrophilic colloid is polyvinyl alcohol.

10. The improvement in a process as claimed in claim 9 wherein the polyvinyl alcohol has a degree of hydrolysis of 70–80% and a viscosity in 4% aqueous solution at 20° C. of 5 centipoises.

11. The improvement in a process as claimed in claim 2 wherein the ratio of amount of copolymer to that of colloid is in the range of about 0.2:1 to 3:1.

References Cited
UNITED STATES PATENTS

| | | | |
|---|---|---|---|
| 3,663,482 | 5/1972 | Gammon | 260—17 R |
| 2,823,200 | 2/1958 | Longley et al. | 260—92.8 W |
| 3,161,623 | 12/1964 | Kühne | 260—92.8 W |
| 3,375,238 | 3/1968 | Bauer et al. | 260—92.8 W |

WILLIAM H. SHORT, Primary Examiner

L. M. PHYNES, Assistant Examiner

U.S. Cl. X.R.

260—29.6 ME, 92.8 W